No. 633,712. Patented Sept. 26, 1899.
O. L. BADGER.
HEATING AND VENTILATING ROOMS.
(Application filed Feb. 13, 1897.)
(No Model.) 3 Sheets—Sheet 1.
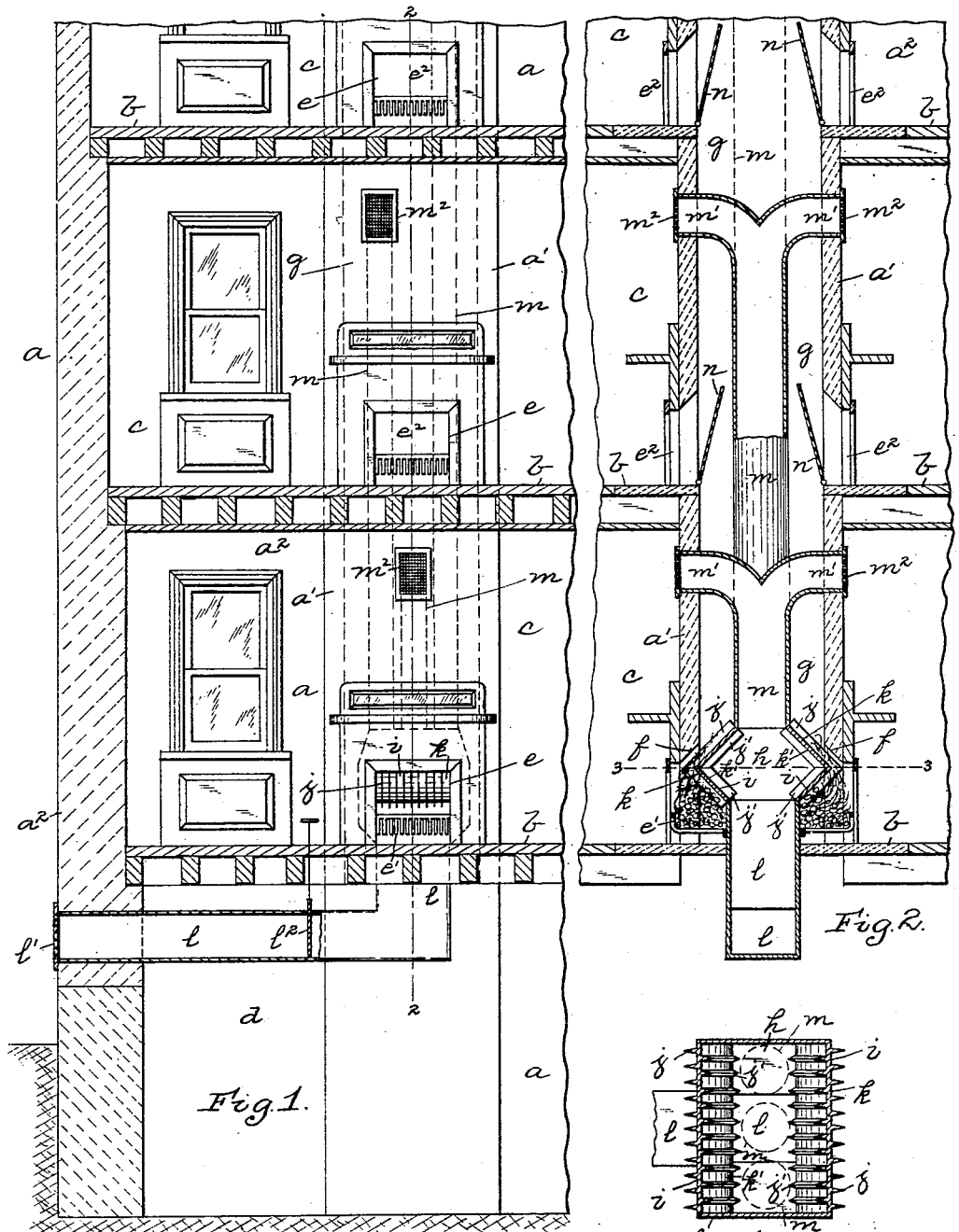
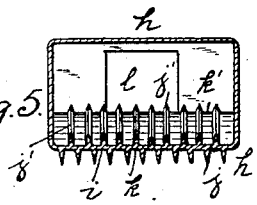

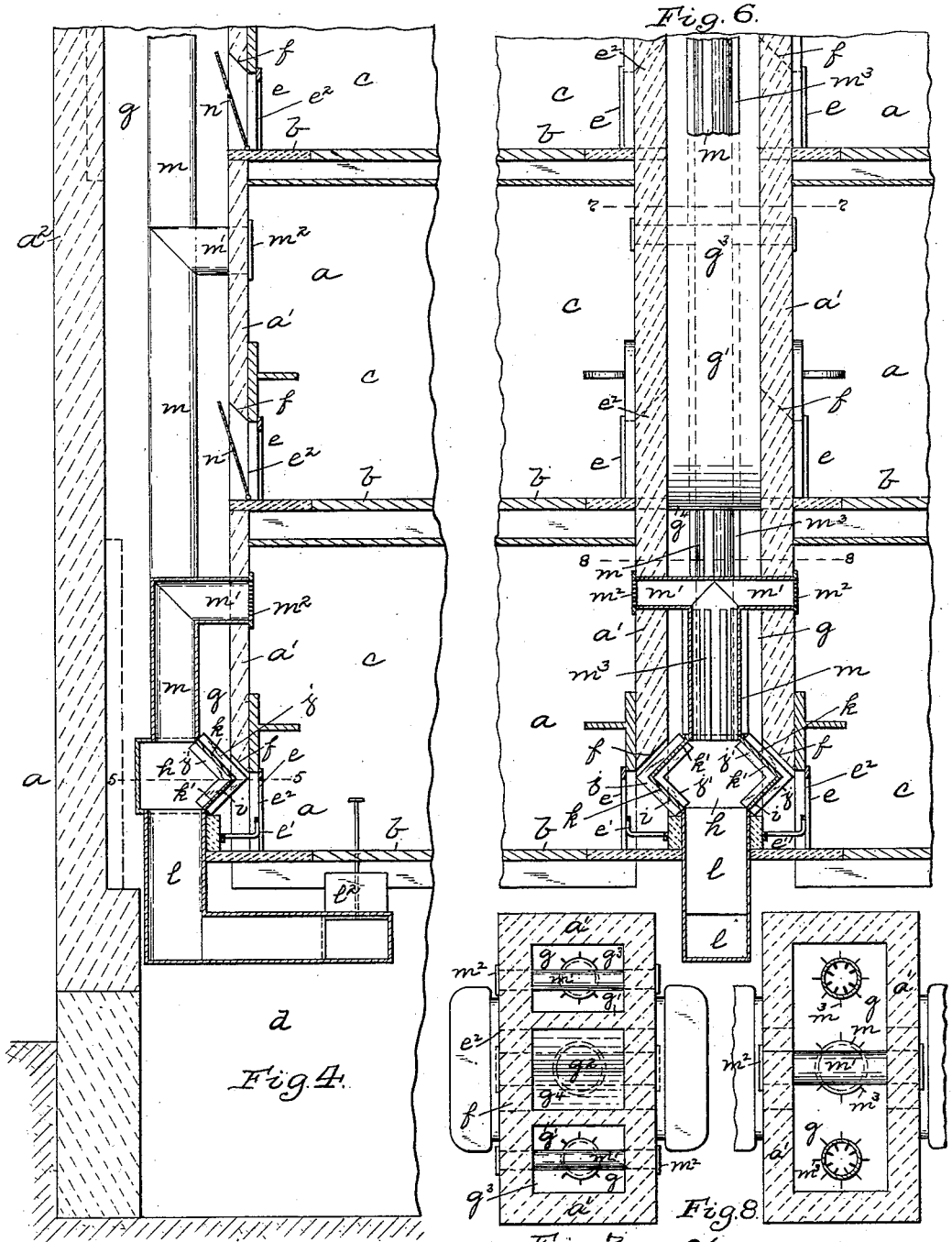

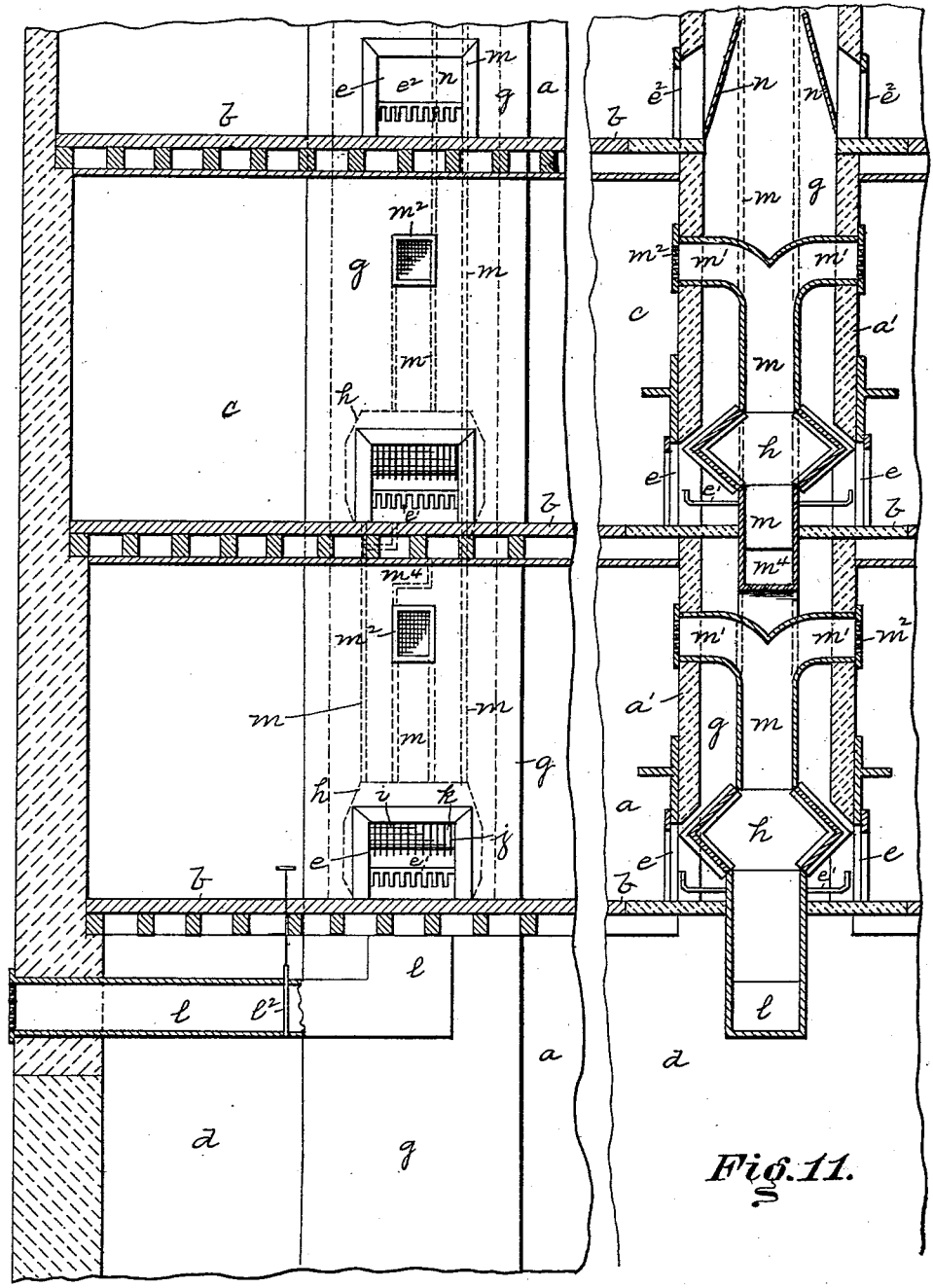

UNITED STATES PATENT OFFICE.

OLIVER L. BADGER, OF ALLEGHENY, PENNSYLVANIA.

HEATING AND VENTILATING ROOMS.

SPECIFICATION forming part of Letters Patent No. 633,712, dated September 26, 1899.

Application filed February 13, 1897. Serial No. 623,211. (No model.)

*To all whom it may concern:*

Be it known that I, OLIVER L. BADGER, a citizen of the United States, residing at Allegheny, in the county of Allegheny and State of Pennsylvania, have invented certain new and useful Improvements in Heating and Ventilating Rooms; and I do hereby declare the following to be a full and exact description thereof.

My invention relates to heating and ventilating rooms.

The object of my invention is to provide a cheap and effective device which is extremely simple in its application and thoroughly practical in its operation and especially designed to be used in connection with the waste heat from the heating apparatus of houses and public buildings in order to more thoroughly warm the room or apartment in which it is used.

Another object of my invention is to introduce pure heated air into the room or apartment and attain the proper regulation of the same, as well as to exhaust the air within the room or apartment for ventilation; and a still further object of my invention is to introduce pure heated air into a room and exhaust the same so that the pure heated air will be utilized upon the breathing-line in the room, while the cold or impure air at the bottom of the room will be carried off at or near the floor-line.

My invention consists, generally stated, in the novel construction, arrangement, and combination of parts, as hereinafter more specifically set forth and described, and particularly pointed out in the claims.

To enable others skilled in the art to which my invention appertains to construct and use the same, I will describe the same more fully, referring to the accompanying drawings, in which—

Figure 1 is a sectional view of part of building, showing my invention applied thereto. Fig. 2 is a section on the line 2 2, Fig. 1. Fig. 3 is a cross-section on the line 3 3, Fig. 2, showing the heating-chamber. Fig. 4 is a longitudinal section of the hot-air flue as applied to the outer walls of a building. Fig. 5 is a cross-section on the line 5 5, Fig. 4, showing another form of heating-chamber. Fig. 6 is a longitudinal section of hot-air flue, showing my invention applied to a fireproof building. Fig. 7 is a cross-section thereof on the line 7 7, Fig. 6. Fig. 8 is a cross-section on the line 8 8, Fig. 6. Fig. 9 is an end view of one of the hot-air pipes shown in Figs. 6, 7, and 8; and Figs. 10 and 11 are sectional views of a building, showing another form of my invention.

Like letters herein indicate like parts in each of the figures of the drawings.

As illustrated in the drawings, $a$ represents a building provided with the several floors $b$, upon which are different rooms or apartments $c$, and the cellar $d$ below the same. Within the different rooms $c$ are the recesses $e$, which are provided with the ordinary flues $f$, communicating with the smoke and ventilating flue $g$ between the recesses $e$ and within the walls $a'$ of the building $a$. The recesses $e$ upon the first floor are preferably provided with the grates $e'$ to form fireplaces $e^2$, within which can be placed any kind of fuel desired, such as coal, coke, wood, or gas, for burning. Located within the recesses $e$, preferably upon the first floor of the building $a$, in the smoke and ventilating flue $g$, back of the grates $e'$, is the heating-chamber $h$, which is preferably formed of cast metal and of the design shown in the drawings to form the back walls $i$ of the fireplaces $e$. A number of radiating-plates $j\,j'$ are formed upon the outside face $k$ and inside face $k'$ of the heating-chamber $h$, and connected to the bottom of the heating-chamber $h$ is the cold-air flue $l$, which is preferably formed of galvanized sheet-iron and extends down into the basement or cellar $d$ of the building $a$ and preferably communicates through the outer wall $a^2$ of the building $a$ with the open air. The cold-air flue $l$ can be provided with a register $l'$ on its outer end and controlled by a damper $l^2$, operated in any suitable manner from the rooms $c$ on the first floor of the building $a$. Leading from the top of the heating-chamber $h$ are the hot-air flues $m$, which are preferably formed of cast or galvanized iron and can be used of any number corresponding to the number of rooms to be warmed, each flue $m$ passing up in the smoke and ventilating flue $g$ and having the branch flues $m'$ on each side thereof leading into the different rooms $c$ on each side of the smoke and ventilating flue $g$ at or above the head-line or near the ceiling-line and provided with the registers $m^2$ thereon, which can be controlled in any suitable manner from the rooms $c$ in the building $a$. Deflecting-plates $n$ are preferably placed in each one of the recesses $e$ upon the upper floors $b$ of the building $a$, as shown in Fig. 2, and extend out into the smoke and ventilating flue $g$. The deflecting-plates $n$ can be hinged or pivoted in the recesses $e$ in any suitable manner so as to be operated within the room to vary the size of the flues $f$, leading into the smoke and ventilating flue $g$. The deflecting-plates $n$ preferably extend above the recesses on the upper floors, so as to prevent the entrance of smoke or heat into the rooms $c$ through the recesses $e$.

The operation of my improved device for heating and ventilating rooms is as follows: The particular kind of fire or heat desired can be started in the grates $e'$ of the recesses $e$ upon the first floor of the building $a$. The waste products of combustion will pass up the flues $f$ into the smoke and ventilating flue $g$, and the heat from such fire will strike against the back walls $i$ and radiating-plates $j$ on the heating-chamber $h$, so heating the cold air as it passes into the heating-chamber $h$ from the cold-air flue $l$ and forming hot air within the chamber $h$. The hot air so formed within the heating-chamber $h$ will pass up into the hot-air flues $m$ and into the different rooms $c$ in the building $a$ through the branch flues $m'$ and registers $m^2$. The waste products of combustion as they pass up the smoke and ventilating flue $g$ and striking against the hot-air flues $m$ and branch flues $m'$ will more thoroughly heat the air within the hot-air flues $m$ and branch flues $m'$ before passing into the rooms $c$. The rooms containing the recesses $e$ are ventilated by allowing the heated air to exhaust or pass out through the flues $f$ at the top of the recesses $e$ into the smoke and ventilating flue $g$, and the deflecting-plates $n$ act to prevent the entrance of smoke or heat into the rooms $c$, as well as to allow the heated air within the rooms $c$ to exhaust or pass out through the flues $f'$ into the smoke and chimney flue $g$ through the recesses $e$, so as to ventilate the rooms $c$ and form a continuous circuit within the rooms $c$. These deflecting-plates $n$ can be so arranged by any suitable means connected thereto from the room as to open and close or vary the size of the flues $f$ within the recesses $e$. If no hot air is desired in the rooms $c$, the registers $m^2$ can be closed, and the amount of hot air desired within the rooms $c$, can be regulated by the registers $m^2$ from the rooms $c$.

In Fig. 4 I have shown my invention as applied to the smoke and ventilating flue $g$, formed in the outer wall $a^2$ of the buildings $a$, and in this case the hot-air flues $m$ only communicate with the various rooms on one side of the smoke and ventilating flue $g$, and the heating-chamber $h$ is preferably formed with the radiating-plates $jj'$ only on one side, forming the back wall $i$ of the fireplace $e^2$ on the first floor.

In Figs. 6, 7, and 8 is shown my invention as applied to a fireproof building having only fireplaces on the first floor, and consists in doing away with the deflecting-plates $n$ and dividing the smoke and ventilating flue $g$ by means of walls or partitions $g'$ above the first floor of the building to form the ventilating-flue $g^2$ for the rooms above the first floor and smoke and ventilating flues $g^3$ for the fireplaces on the first floor, which carry the hot-air pipes for the upper floors. In this case the flues $f$, leading from the recesses on the upper floors, communicate with or open into the ventilating-flue $g^2$, which preferably opens into the open air and is closed at its lower end, as at $g^4$. This arrangement permits the hot-air flues for the upper floors to communicate with the various rooms from the smoke-flues $g^3$ and allowing the rooms to be ventilated through the recesses $e$ into the ventilating-flues $g^2$ without danger of any smoke or flames entering the rooms from the smoke-flues $g$ or $g^3$.

If desired, the hot-air flues $m$ can be provided with a number of radiating-plates $m^3$ on the inside and outside faces thereof for the purpose of giving a greater radiation of heat from the fireplaces and smoke-flues before passing into the rooms to be heated.

In Figs. 10 and 11 is shown my invention as having the heating-chambers $h$ applied to the smoke and ventilating flue $g$ on both the first and second floors of a building and doing away with the deflecting-plates $n$ on these floors, so that, if desired, the second-floor fireplaces can be used without using the first-floor fireplaces. These fireplaces could also be used on the third floor, so as to do away with using either of the fireplaces on the first and second floors, or both. In this case the hot-air pipes leading from the heating-chamber $h$ on the first floor to the heating-chamber $h$ on the upper floor can be led to the center of the upper heating-chambers $h$ by the elbows $m^4$, and if only two floors are provided with heating-chambers $h$ the third or upper floors can have their recesses $e$ provided with deflecting-plates $n$, as shown, so that, if desired, the second-floor heating-chambers can be used without using the ones on the first floor, and vice versa.

It is obvious that the heating-grate can be placed within the basement or cellar $d$ and the heating-chamber $h$ connected thereto with the hot-air flues $m$ and branch flues $m^2$ leading therefrom to the different rooms $c$ on the floors $b$ of the building $a$, and, if desired, any suitable feeding apparatus can be applied thereto, such as a hand-stoker applied underneath the grate of any crude construction. It is also obvious that my improved heating-chamber $h$ can be applied to any one of the recesses $e$ upon the different floors $b$ of the building $a$, as shown in Figs. 10 and 11, and the hot-air flues $m$, connected thereto and with the rooms c, as well as each room c, can have a heating-chamber h connected to its grate e' with a separate hot-air flue m, connected to the heating-chamber h and to the floor c and suitably controlled therefrom.

Various modifications in the construction, position, design, and shape of the various parts of the device may be resorted to without departing from the spirit of the invention or sacrificing any of its advantages.

It will then be seen that my improved device for warming and ventilating rooms is simple and cheap in its construction and can be applied to any particular form of grate or fireplace without the material changing of any of the parts of the flues or buildings. It can be used and applied to any fireplace in the building or placed in the cellar and operated therefrom, if desired. By its use all the waste heat from the fireplace can be used in heating up the heating-chamber and the hot-air flues leading therefrom, and pure heated air can be introduced into the room from the cellar or open air, as desired. The rooms can be properly heated and ventilated at all times, and the heat and ventilation can be regulated at will. The device will draw the heated air down from the top of the room to be utilized at the breathing-line in the room, and the cold air at the bottom of the room will be carried off at or near the floor-line, so causing a continuous circuit within the room to insure perfect warming or heating and ventilation. The device possesses many advantages as regards sanitation, and its use in buildings would greatly lessen disease and promote good health. On account of the peculiar formation of the heating-chamber great heat radiation is obtainable, and by the use of one fireplace a number of rooms could be evenly and thoroughly heated and ventilated.

What I claim as my invention, and desire to secure by Letters Patent, is—

1. The combination with a fireplace opening into a smoke-flue, of a heating-chamber located within the smoke-flue in the rear of the fireplace and forming the back wall thereof, a cold-air duct leading into said heating-chamber, hot-air flues leading from said heating-chamber and communicating with the rooms, recesses within the rooms communicating with the smoke-flue for the exit of air to ventilate the rooms, and deflecting-plates within the smoke-flue, opposite the recesses within the rooms, to prevent the escape of smoke and heat into the rooms from the smoke-flue, substantially as and for the purposes set forth.

2. The combination with a fireplace opening into a smoke-flue, of a heating-chamber located within the smoke-flue in the rear of the fireplace and forming the back wall thereof, a cold-air duct leading into said heating-chamber, hot-air flues leading from said heating-chamber and communicating with the rooms, recesses within the rooms communicating with the smoke-flue for the exit of air to ventilate the rooms, deflecting-plates within the smoke-flue, opposite the recesses in the rooms, to prevent the escape of smoke and heat into the rooms from the smoke-flue, and radiating-plates on said heating-chamber and hot-air flues extending into the fireplace and smoke-flue to radiate the heat within the heating-chamber hot-air flues, substantially as and for the purposes set forth.

3. The combination with a smoke and ventilating flue, of fireplaces fitting within openings connected to the smoke and ventilating flue, a heating-chamber within the smoke and ventilating flue in the rear of the fireplaces and forming the back wall thereof, a cold-air duct for supplying cold air to said heating-chamber, hot-air flues or conduits connected to said heating-chamber for supplying hot air to the same rooms in which the fireplaces are located or to the rooms above, openings within the rooms in which the fireplaces are located and in the rooms above for the exit of air into the smoke and ventilating flue to ventilate the same, recesses within the rooms communicating with the smoke-flue for exit of air to ventilate the rooms, and deflecting means above the heating-chambers and within the recesses to prevent the escape or entrance of smoke or heat into the upper rooms through the said recesses.

In testimony whereof I, the said OLIVER L. BADGER, have hereunto set my hand.

OLIVER L. BADGER.

Witnesses:
J. B. SWEITZER,
J. N. COOKE.